Nov. 15, 1955 G. R. MARNER 2,723,800
ELECTROMECHANICAL AXIS CONVERTER
Filed May 16, 1952 2 Sheets-Sheet 1

$Y' = X \sin \theta + Y \cos \theta$ $X' = X \cos \theta - Y \sin \theta$

INVENTOR.
GENE R. MARNER
BY
ATTORNEY

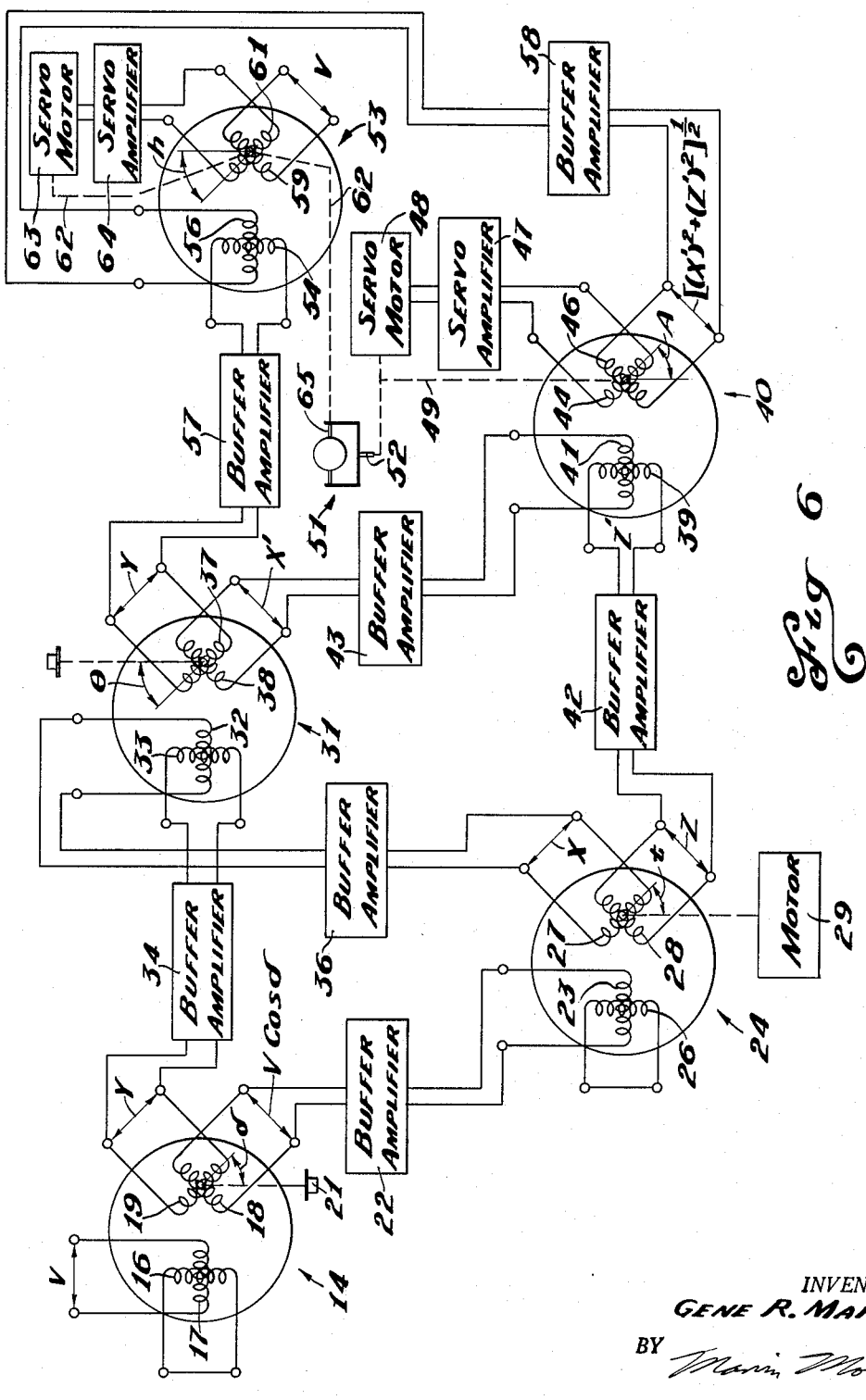

United States Patent Office 2,723,800
Patented Nov. 15, 1955

2,723,800

ELECTROMECHANICAL AXIS CONVERTER

Gene R. Marner, Iowa City, Iowa, assignor to Collins Radio Company, Cedar Rapids, Iowa, a corporation of Iowa Application May 16, 1952, Serial No. 288,259

7 Claims. (Cl. 235—61)

This invention relates in general to mounting devices, and in particular to an electronic axis converter for driving an alt-azimuth system from polar data.

It is well known to those skilled in the art that celestial bodies move with substantially constant declination. This makes it easy to continuously track a particular celestial body with a polar axis mount. The declination axis is fixed at the known declination and the hour angle axis may be driven at a constant rate of 15 degrees per hour and the body will be continuously tracked, assuming that the tracker is originally set on the body. In polar axis mounts the hour angle axis varies in its angular relationship to the horizon at different latitudes on the face of the earth. Also, the inclined hour angle axis does not lend itself well to mechanical support of heavy antenna and telescopes. It is therefore very desirable to obtain a computer which may be driven at a constant rate while maintaining declination constant and which simultaneously furnishes azimuth and elevation shaft positions that may be used for controlling an alt-azimuth mounted structure.

Various attempts have been made to make mechanical axis converters wherein the mechanical structure automatically converts from polar to alt-azimuth axes. Such converters are rather expensive and have generally been constructed for a fixed latitude. When latitude is varied the mechanical structure becomes impractically complicated. For a more detailed description of a mechanical axis converter designed for a fixed latitude, reference may be made to Patent Number 2,466,255.

It is an object of this invention to provide an electrical computer which continuously converts from polar to alt-azimuth axes.

Another object of this invention is to provide an axis converter which may be used at any latitude.

Still another object is to provide an axis converter which operates when latitude is continuously changing.

Yet another object of this invention is to provide a small and inexpensive axis converter which may be used to drive an alt-azimuth axis mount.

Further objects, features and advantages of this invention will become apparent from the following description and claims when read in view of the drawings, in which;

Figure 6 illustrates the computer according to the principles of this invention.

Figure 1 illustrates a three-dimensional Cartesian coordinate system wherein the y axis is parallel to the earth's axis of rotation, the z axis points west from the origin, and the x axis extends from the observer's position, which is the origin, to the intersection of the observer's meridian and the celestial equator.

A celestial body S is shown with a unit vector T pointing toward it. The vector T may be defined by its declination $\delta$ and its hour angle $t$. For the vector T to track the celestial body S, it is only necessary for the fixed declination $\delta$ to be set and to vary the hour angle $t$ at a constant rate so that the vector T will describe a cone about the axis y.

Figure 2:
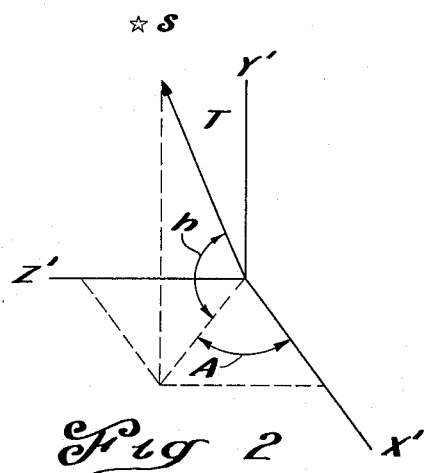
Figure 2 illustrates a terrestrial coordinate system.

Figure 2 illustrates a terrestrial coordinate system wherein the $y'$ axis extends from the observer through his zenith, the $x'$ axis lies in the observer's horizon pointing south, and the $z'$ axis points west. A celestial body position S may be defined relative to this coordinate system by the elevation angle $h$ from the horizontal plane $x'$, $z'$, and the azimuth angle A.

Using the coordinate system of Figure 2, to track the celestial body A requires that both angles $h$ and A be continuously varied at a changing rate.

Figure 1:
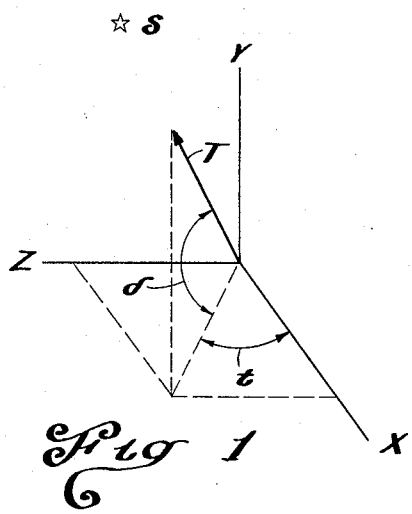
Figure 1 illustrates a polar coordinate system.
Figure 3:
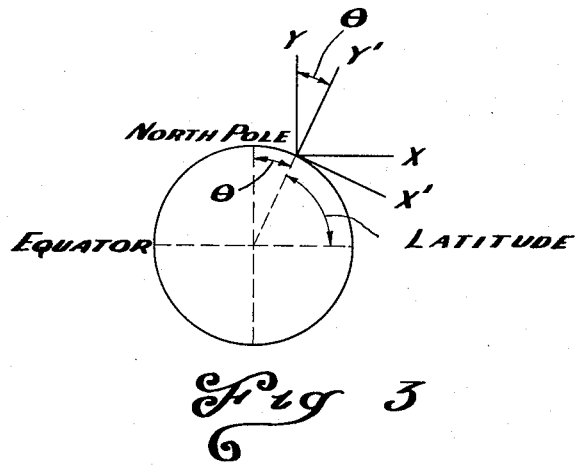
Figure 3 illustrates the relationship between the polar and terrestrial coordinate systems.

Figure 3 illustrates the relationship between the coordinate systems of Figures 1 and 2 and it is to be noted that the $x'$, $y'$, axes are rotated with respect to the $x$, $y$ axes by an angle $\theta$ which is the complement of the observer's latitude. The z axes are the same in both instances and extend outward perpendicular to Figure 3.

Figure 4:
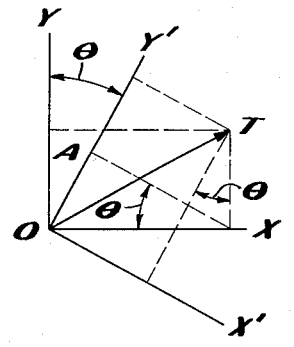
Figure 4 illustrates in more detail the relationships between the polar and terrestrial coordinate systems.

Figure 4 illustrates once again the relationship between the two coordinate systems with the vector T drawn therein. The vector O—T is the projection of the vector T on the $x$, $y$ plane. From the geometry of Figure 4 it is observed that:

(1) $\qquad x' = x \cos \theta - y \sin \theta$ (2) $\qquad y' = x \sin \theta + y \cos \theta$ The z component is unchanged by the rotation, so $z' = z$.

Figure 5:
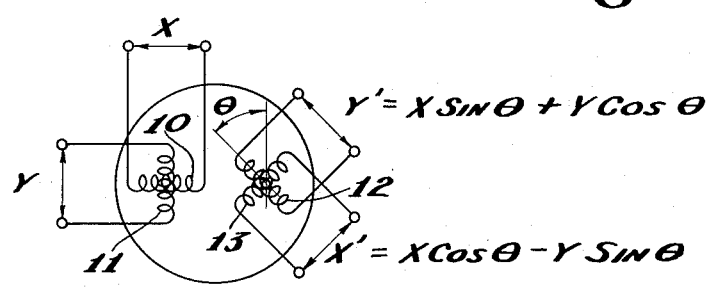
Figure 5 illustrates a resolver.

It is possible to continuously convert from $x$ and $y$ to $x'$ and $y'$ with the resolver shown in Figure 5. If the value $x$ is furnished to a first stator winding 10 of the resolver, and the value $y$ is furnished to a second stator winding 11, which is at right angles to the winding 10, and if a pair of rotor windings 12 and 13, respectively, are fixed at right angles to each other but movable relative to the stator, then the winding 12 will produce an output proportional to $y'$ and the winding 13 will produce an output proportional to $x'$ if the $x$ and $x'$ windings are displaced at angle $\theta$. The factor of proportionality may be adjusted to unity if desired, which is the case assumed in Figures 5 and 6.

It is observable from Figure 1 that:

(3) $\qquad\qquad x = \cos \delta \cos t$ (4) $\qquad\qquad y = \sin \delta$ and (5) $\qquad\qquad z = \cos \delta \sin t$ With reference to Figure 6, a first resolver 14 has stator windings 16 and 17 at right angles to each other and rotor windings 18 and 19 which are at right angles to each other. If the winding 16 is shorted and a fixed A. C. voltage V is supplied across the winding 17 and the rotor set by knob 21 to declination angle $\delta$ of the celestial body to be tracked, the output of winding 19 will be equal to $y$ and the output of winding 18 will be equal to $V \cos \delta$.

A buffer amplifier 22 receives the output of the winding 18 and supplies it to a first stator winding 23 of a resolver 24. The second stator winding 26 is shorted. The rotor comprises windings 27 and 28 which may be driven by a motor 29 that drives it at a constant rate, thus maintaining the position of the rotor at the hour angle of the celestial body. The output of the winding 27 will be equal to $x$ and the output of the winding 28 will be equal to $z$.

A third resolver 31 has stator windings 32 and 33, respectively. A buffer amplifier 34 receives the output of the rotor winding 19 and furnishes an output to the stator winding 33. Likewise a buffer amplifier 36 receives an input from the rotor winding 27 and furnishes an output to the stator winding 32. The rotor of the resolver 31 is set to an angle $\theta$ equal to the complement of the observer's latitude. The output of the rotor windings 37 and 38, respectively, will be $y'$ and $x'$.

A fourth resolver 40 has a pair of stator windings 39 and 41, respectively. A buffer amplifier 42 receives the $z$ output from the winding 28 and supplies an input to the winding 39. A buffer amplifier 43 receives the $x'$ output from resolver 31 and supplies it to the winding 41.

The rotor of the resolver 40 has a pair of windings 44 and 46. The winding 44 has its output connected to a servo amplifier 47 which supplies an input to a servo motor 48 which is connected to a shaft 49 that drives the rotor of the resolver 40 until the output of winding 44 is zero.

The position of the shaft 49 is then the azimuth of the celestial body. An alt-azimuth mounted scanning device 51 has its azimuth axis 52 connected to the shaft 49 and is driven by it. It is probably desirable from a design standpoint to use another motor to drive the axis 52 with the other motor controlled by a slave servo system so that the shaft 52 moves with the shaft 49. Such systems are well known to those skilled in the art and will not be described in detail herein.

The winding 46 will produce an output equal to the square root of the sum of the squares of $x'$ and $z'$. A fifth resolver 53 has its stator windings 54 and 56 connected, respectively, to buffer amplifiers 57 and 58. The buffer amplifier 58 is connected to the winding 46 of resolver 40 and the buffer amplifier 57 is connected to the winding 37 of resolver 31.

The rotor windings 59 and 61 of the resolver 53 are driven by a shaft 62 which is connected to a servo motor 63. The servo motor 63 receives an input from servo amplifier 64 which is connected across the output terminals of the winding 61. The winding 59 will produce the voltage V fed into the winding 17 and the shaft position of 62 will be the elevation angle $h$. The shaft 62 is connected to the elevation axis 65 of the apparatus 51.

Thus, it is seen that by using five resolvers of a type commercially available, and by connecting them in the fashion shown in Figure 6, that the mechanism 51 may be made to continuously track a celestial body. The resolvers may be type R600 manufactured by Reeves Instrument Corporation.

The declination of the body is set on the rotor of resolver 14, the complement of the observer's lattitude is set on the rotor of the resolver 31, and the motor 29 drives the rotor of the resolver 24 at a constant rate of 15 degrees an hour to correspond to the hour angle. The resolvers 40 and 53 produce rotor positions which are the azimuth and elevation, respectively, of the celestial body. The elevation and azimuth shaft positions will vary at a non-linear rate and will continuously produce the correct outputs for maintaining an altazimuth mounted device pointed towards the celestial body.

It is seen that this invention eliminates complicated and expensive mechanical axis converters and may be moved in latitude and still maintains its accuracy merely by varying the position of the rotor 31.

Although this invention has been described with respect to particular embodiments thereof, it is not to be so limited as changes and modifications may be made therein which are within the full intended scope of the invention, as defined by the appended claims.

I claim:

1. A computer for continuously presenting the azimuth and elevation of a body comprising, five resolvers with a pair of stator windings and a pair of rotor windings, the first stator winding of the second resolver connected to the first rotor winding of the first resolver, the first stator winding of the third resolver connected to the first rotor winding of the second resolver, the second stator winding of the third resolver connected to the second rotor winding of the first resolver, a first stator winding of the fourth resolver connected to the second rotor winding of the second resolver, the second stator winding of the fourth resolver connected to the first rotor winding of the third resolver, a first servo motor connected to the rotor of the fourth resolver, said first servo motor receiving an input from the first rotor winding of said fourth resolver, the first stator winding of the fifth resolver connected to the second rotor winding of the third resolver, the second stator winding of the fifth resolver receiving an input from the second rotor winding of the fourth resolver, and a second servo motor connected to the rotor of the fifth resolver and receiving an input from one of the rotor windings of said fifth resolver.

2. An automatic azimuth and elevation computer comprising, five resolvers each having a pair of stator windings mounted at right angles to each other and a pair of rotor windings mounted at right angles to each other, the rotor of the first resolver set to the declination of the body being tracked, one of the stator windings of the first resolver shorted out, an input voltage supplied to the other stator winding of said first resolver, the first stator winding of the second resolver shorted out, the second stator winding of the second resolver connected to the first rotor winding of the first resolver, a motor connected to the rotor of the second resolver, the first stator winding of the third resolver connected to the second rotor winding of the first resolver, the second stator winding of the third resolver connected to the first rotor winding of the second resolver, the rotor of said third resolver set to an angle equal to the complement of the latitude of the computer's position, the first stator winding of the fourth resolver connected to the second rotor winding of the second resolver, the second stator winding of the fourth resolver connected to the first rotor winding of the third resolver, a second motor connected to the rotor of the fourth resolver, the first rotor winding of the fourth resolver supplying an input to the second motor, the first stator winding of the fifth resolver connected to the second rotor winding of the fourth resolver, the second stator winding of the fifth resolver connected to the second rotor winding of the third resolver, a third motor connected to the rotor of said fifth resolver, a first rotor winding of said fifth resolver connected to the third motor, and the shaft positions of the second and third motors are equal to the azimuth and elevation angles of the body being tracked.

3. An automatic computer for converting the polar declination and hour angle of a celestial body to azimuth and elevation comprising, five resolvers each of which has a pair of stator windings wound at right angles to each other and a pair of rotor windings mounted at right angles to each other, an alternating voltage source supplied to the first stator winding of the first resolver, the second stator winding of said first resolver shorted-out, the rotor of said first resolver set to the declination angle of the celestial body being tracked, a first motor connected to the rotor of the second resolver to drive it at a constant rate so as to continuously produce a shaft position proportional to the hour angle of the celestial body, the first stator winding of said second resolver shorted out, the second stator winding of the second resolver connected to the first rotor winding of the first resolver, the first stator winding of the third resolver connected to the second rotor winding of the first resolver, the second stator winding of the third resolver connected to the first rotor winding of the second resolver, the rotor of said third resolver set to the complement of the computer's latitude, a fourth resolver with its first stator winding connected to the second rotor winding of the second resolver and its second stator winding connected to the first rotor winding of the third resolver, a second motor connected to the rotor of the fourth resolver, the first rotor winding of the fourth resolver supplying an input to said second motor, the first stator winding of the fifth resolver receiving an input from the second rotor winding of the third resolver and the second stator winding of the fifth resolver receiving an input from the second rotor winding of the fourth resolver, a third motor connected to the rotor of the fifth resolver and receiving an input from the first rotor winding of the fifth resolver and the rotors of the fourth and fifth resolvers producing, respectively, shaft positions equal to the azimuth and elevation angles of the celestial body.

4. A computer for converting celestial coordinates to terrestrial coordinates comprising, five resolvers each having a pair of stator windings mounted at right angles to each other and a pair of rotor windings mounted at right angles to each other and a pair of rotor windings mounted at right angles to each other, a first shaft connected to the rotor of the first resolver to set it to the declination of the celestial body, a first motor connected to the rotor of the second resolver to position it to the hour angle of the celestial body, the rotor of said third resolver positioned to an angle complementary to the computer's latitude, a first servo motor connected to the rotor of the fourth resolver and receiving an input from the rotor of the fourth resolver to position it until the input is equal to zero and the angular position of the rotor is equal to the azimuth of the celestial body, a second servo motor connected to the rotor of the fifth resolver and receiving an input from the rotor of the fifth resolver to position it to an angle equal to the elevation angle of the celestial body, the second and third resolvers receiving inputs to their stators from the rotor of the first resolver, the third and fourth resolvers receiving inputs to their stators from the rotor of the second resolver, the fourth and fifth resolvers receiving inputs on their stators from the third resolver's rotor, and the fifth resolver receiving an input to one of its stators from the rotor of the fourth resolver.

5. Control means comprising, five resolvers each having a pair of stators mounted at right angles to each other and a pair of rotors mounted at right angles to each other, one of the stators of the first resolver connected to an alternating voltage source, the second stator of the first resolver shorted-out, a first pair of buffer amplifiers connected, respectively, to the first and second rotor windings of the first resolver, the first stator winding of the second resolver connected to the first of said pair of buffer amplifiers, the second stator winding of the second resolver shorted-out, the first stator winding of the third resolver connected to the other of said pair of buffer amplifiers, a third buffer amplifier connected to the first rotor winding of said second resolver and to the second stator winding of the third resolver, a fourth buffer amplifier connected to the second rotor winding of the second resolver, the first stator winding of the fourth resolver connected to said fourth buffer amplifier, a fifth buffer amplifier connected to the second stator winding of the fourth resolver and to the first rotor winding of the third resolver, a sixth buffer amplifier connected to the second rotor winding of the third resolver and to the first stator winding of the fifth resolver, a seventh buffer amplifier connected to the first rotor winding of the fourth resolver and to the second stator winding of the fifth resolver, an hour angle motor connected to the rotor of the second resolver, a first servo motor shafted to the rotor of the fourth resolver and receiving input from the second rotor winding of the fourth resolver, a second servo motor shafted to the rotor of the fifth resolver and receiving an input from the first rotor winding of the fifth resolver, the second rotor winding of the fifth resolver shorted-out, and the rotors of said first and third resolvers set, respectively, to the declination angle of the celestial body and the angle complementary to the computer's latitude.

6. A computing means comprising, a declination resolver, an hour angle resolver, a latitude resolver, an azimuth resolver, and an elevation resolver, each of said resolvers having a pair of stator windings at right angles to each other and a pair of rotor windings at right angles to each other, the declination resolver supplying an input to the latitude and hour angle resolvers, the hour angle resolver supplying inputs to the latitude and azimuth resolver, the latitude resolver supplying inputs to the elevation and azimuth resolver, and the azimuth resolver supplying an input to the elevation resolver.

7. A computer comprising, a declination resolver, an hour angle resolver, a latitude resolver, an azimuth resolver, and an elevation resolver, a first driving means connected to the declination resolver to position its rotor to the declination of a celestial body being tracked, a second driving means connected to the hour angle resolver to position its rotor to the hour angle of the celestial body being tracked, a third driving means connected to the latitude resolver to position its rotor to the complementary angle of the computer's latitude, a first servo motor receiving an input from the rotor of the azimuth resolver and connected to the rotor to position it to the azimuth of the celestial body, and a second servo motor receiving an input from the rotor of the elevation resolver and connected to it to position it to the elevation of the celestial body.

References Cited in the file of this patent

UNITED STATES PATENTS

| | | |
|---|---|---|
| 2,463,687 | Gittens | Mar. 8, 1949 |
| 2,600,159 | Ergen | June 10, 1952 |

FOREIGN PATENTS

| | | |
|---|---|---|
| 579,325 | Great Britain | July 31, 1946 |

OTHER REFERENCES

"Apparatus for the Transformation of Rectangular Coordinates Using Arma-Resolvers"; P. B. Weisz et al.; N. D. R. C.–14, July 10, 1944; P. B. 23322; declassified May 21, 1946. (18 pages, 3 shts. dwg.)

"Some Aspects of Electrical Computing (part 2)"; J. Bell, Electronic Engineering, July 1951; pages 264–269.

"Electronic Instrument"; Greenwood, Holdom and MacRae; McGraw-Hill Book Co., New York, 1948, pages 118–120, 158–162 and 192–197.